UNITED STATES PATENT OFFICE.

HERMAN HEUSER, OF CHICAGO, ILLINOIS.

PREPARATION OF ALCOHOL-REDUCED BEER 1,308,588.  Specification of Letters Patent.  Patented July 1, 1919.

No Drawing.  Application filed August 15, 1918. Serial No. 249,957.

*To all whom it may concern:*

Be it known that I, HERMAN HEUSER, a citizen of the United States, residing at Chicago, in the county of Cook and State of Illinois, have invented certain new and useful Improvements in the Preparation of Alcohol-Reduced Beer, of which the following is a specification.

My invention relates to the preparation of alcohol-reduced beer, and in particular its object is to obtain an alcohol-reduced beer that remains light-proof indefinitely under subsequent conditions of exposure to light in handling and dispensing the same.

Alcohol-reduced beers are rendered cloudy or turbid and acquire the disagreeable taste known as "light-taste" when exposed to sun light because the ultra-violet rays ozonize the oxygen in the air contained in the beverage, and the ozone on account of its powerful chemical activity readily destroys or decomposes the organic substances, particularly those of protein origin such as the albuminoids of beer, suspended in the beverage, even if only minute quantities of ozone are produced. In the presence of air, which is usually absorbed in considerable quantity by alcohol-reduced beer during the steps of cooling and storing in its manufacture and is always introduced by the $CO_2$ used for carbonation, and in the presence of the peptones and albumoses which exist even in a beer that is clear and brilliant to the naked eye in a partly dissolved or suspended state because on account of their colloidal condition they do not possess perfect solubility, this destruction occurs rapidly with exposure of the beverage to sun light; it starts at once upon exposure of the beverage to the direct solar rays as the impact of the ultra-violet rays traveling at enormous speed against these large moleculed colloidal substances produces the intense molecular energy required for the formation of ozone from the air. Further, even in the absence of air the protein substances themselves ultimately furnish oxygen for the production of ozone when subjected to the direct rays of sun light, although this proceeds slowly.

By my process I deoxygenate the air in the beer, and I also stabilize the protein content of the alcohol-reduced base liquid.

In order that the various features of my invention may be understood I will describe the deoxygenating treatment as applied to 100 barrels of alcohol-reduced beer boiled in the brew kettle at atmospheric pressure or in a vacuum pan under reduced pressure to reduce its alcohol, and possessing the customary qualitative and quantitative composition including an alcohol-content of less than ¼ of 1% by volume, for example 0.05% by volume, and stored for a suitable length of time at usual cellar temperature. After storage of the beverage for the desired length of time, say one week, it receives an addition of a suitable quantity of potassium pyrosulfite, preferably from 4 to 12 grams per barrel of beverage, according to the amount of free oxygen contained in the beverage. Upon the addition of the sulfite the entire batch of beverage is artificially carbonated under a gage pressure of 10 to 15 lbs. per square inch, while the batch is being mechanically stirred. Such stirring promotes the speedy dissolution of the potassium pyrosulfite and its uniform distribution in the entire batch, whereby the action of the sulfite upon the beverage is greatly promoted, and such stirring taking place under pressure greatly intensifies such action. Naturally the length of time used for carbonating depends upon the quantity of $CO_2$ introduced into the beverage per unit of time, and in case the same averages ½ lb. per minute carbonation is usually accomplished within 3½ to 4 hours, so that by sulfiting the beverage while it is being carbonated the treatment is effectually completed in bulk. After its carbonation the beverage is ready for the market, and it may be filtered and filled into the trade packages.

The sulfiting of the beverage may be accomplished by any suitable introduction of sulfurous acid into the beverage and the exposure of the beverage to the chemical action thereof, and while it is convenient to accomplish the sulfiting by simply adding to the beverage the salts of sulfurous acid, preferably the alkali sulfites of the two series $RHSO_3$ and $R_2S_2O_5$, I may employ sulfurous acid, or I may add $SO_2$-gas from a cylinder containing liquefied $SO_2$, which gas changes into sulfurous acid on its arrival in the beverage; the sulfiting with $SO_2$-gas is particularly adaptable to the period of artificial carbonation, because the $SO_2$-gas arising from liquefied $SO_2$ in a cylinder enters the beverage by its own pressure without any external aid, as the vapor tension of the $SO_2$-gas at the temperature at which such cylinder would ordinarily be stored and the gas introduced is amply high to overcome the carbonating pressure, and moreover it is readily applied to carbonating in bulk because the amount of $SO_2$-gas required for a certain bulk quantity of beverage being relatively large makes it easy to correctly measure off the gas, and any slight error in measuring, which is always possible in practice, becomes negligible for so large a quantity of $SO_2$.

In any form or way I accomplish the sulfiting after the alcohol reduction, and preferably during artificial carbonation under pressure and while a bulk quantity is mechanically stirred or agitated, because the sulfiting of a bulk quantity which is mechanically stirred commences and is accelerated for the entire batch of beverage forthwith upon the introduction of the sulfiting material, and thus it is at no time locally confined as it would be if the beverage were not stirred.

The final beverage contains a small amount of sulfurous acid, in the above instance about 0.002%, the larger portion of which is chemically bound, while the smaller one is free. Instead of air, which is a mixture of active oxygen and inert nitrogen, the final beverage is shown by analysis to contain for each 1000 c. c. only about 0.016 of a gram of inert nitrogen of atmospheric origin as distinct from the nitrogen contained in the nitrogenous substances of the beverage, as the oxygen has been used up for the formation of sulfuric acid, which disappeared as such by forming sulfate with one or more bases contained in the organic salts always present in the base beverage. The final beverage has the peculiar properties of not being rendered cloudy or turbid and of not acquiring the "light-taste" when exposed to diffused sun-light; the sulfiting removes the oxygen of the air in the beverage and this absence of free oxygen enables the beverage to obviate the ozonizing effect of the diffused rays of sun light. The sulfiting also postpones the ozonizing action or effect of the direct rays of sun light to such an extent that the beer remains unimpaired by exposure beyond any period required under the ordinary or usual conditions of its use; in the absence of air in the beverage the decomposition of the protein content by the direct rays of sun light and the consequent ozonizing of the oxygen molecularly bound in such content occur only after prolonged and repeated exposures, and when instead of air a small amount of sulfurous acid is present in the beverage the ozonizing action is still longer postponed because the acid being first oxidized to $SO_3$ uses up the ozone formed in the first or initial stage of the ozonizing process, and as this requires many days during constant exposure the beverage stands exposure to the direct rays for exceptionally long periods without impairment in either brilliancy or taste.

The deoxygenation of the air by sulfiting the beverage also supplements the slight air-removing action of the small quantity of live yeast containing fermentable matter, or of the kraeusen, which is added to alcohol-reduced beer to make yeast-treated beer, usually at the rate of 5 barrels of kraeusen pitched to the barrel with 1½ pounds of thick fluid yeast to 100 barrels of beer before it is stored. In the manufacture of regular beer the large quantities of air absorbed by the wort during cooling are removed during the main fermentation, and the fermented beer contains relatively large quantities of $CO_2$ which protects it against the absorption of any considerable amount of air during subsequent storage, and what amount of air it may absorb during storage is removed by the strong kraeusen fermentation usually made by the addition of 15 to 25% of kraeusen. But alcohol-reduced beer is not subjected to a strong fermentation like regular beer which goes through the usual main fermentation, and the amount of live yeast containing fermentable matter which is added for yeast-treating or yeast-fermenting is too small to remove any considerable amount of air absorbed during cooling or to protect the beverage against the absorption of air during storage. Therefore, in making yeast-treated or yeast-fermented alcohol-reduced beer I supplement the insufficient air-removing action of the small quantity of live yeast containing fermentable matter by adding the sulfiting substance which uses up the oxygen of the air for its own oxidation. The sulfiting preserves the taste and flavor of the beverage and particularly the aromatic flavoring substances consisting largely of aldehydes and ethers produced during the yeast-treatment, and it also restores or regenerates the same when they have been changed and generates new flavoring substances on account of the sulfurous acid forming with the aldehydes new additive compounds. Also, as the introduction of the sulfiting substances into the beverage tends to impede the yeast-treatment on account of the antiseptic or preservative property of these substances, I preferably do the sulfiting of the beverage after it is yeast-treated or yeast-fermented.

The sulfiting should be done with discrimination; the amount of the sulfiting substance added must not be too large, because this would destroy the aroma and taste of the beverage as well as impair its wholesomeness. The size of the addition depends upon the amount of air absorbed by the beverage during its manufacture and upon the amount of air introduced with the $CO_2$ used for carbonating, and further upon the amount of sugar and the aroma substances, more particularly of aldehyde structure, with which it unites and forms very stable combinations of increased pleasing aroma, and the size of the addition increases as the amount of these substances increases. However, for average conditions 4 to 12 grams of potassium pyrosulfite or its equivalent in $SO_2$ or $SO_2$-gas per barrel of beverage would be sufficient for alcohol-reduced beer of customary composition. While alcohol has a distinctly retarding influence upon sulfiting, the very slight variations in the amount of alcohol found in alcohol-reduced beers only influence the speed of oxidation of $SO_2$ to $SO_3$, the alcohol is otherwise indifferent to the sulfurous acid, and therefore it does not need to be considered in regulating the amount of sulfite or $SO_2$ or $SO_2$-gas to be added.

Of course, the term "alcohol-reduced" applies to beverages from which the alcohol has been either entirely removed or only so far that they come within the classification of non-intoxicating beverages.

I claim:—

1. The step in the process of preparing alcohol-reduced beer which consists in de-oxidizing alcohol-reduced beer by sulfiting it while it is being mechanically stirred and artificially carbonated.

2. The process of preparing alcohol-reduced beer which consists in de-oxidizing alcohol-reduced beer by yeast-treating and sulfiting it.

3. The process of making alcohol-reduced beer light-proof which consists in subjecting alcohol-reduced beer to deoxygenation by treating it with from 4 to 12 grams of potassium pyrosulfite per barrel of beer.

In testimony whereof I affix my signature in presence of two witnesses.

HERMAN HEUSER.

Witnesses:
J. McROBERTS,
BERNICE GORMLEY.